United States Patent [19]

Warrick

[11] Patent Number: 4,674,536
[45] Date of Patent: Jun. 23, 1987

[54] ELECTROHYDRAULIC VALVES FOR USE IN A SYSTEM

[75] Inventor: Frank G. Warrick, Horton, Mich.

[73] Assignee: Sealed Power Corporation, Muskegon, Mich.

[21] Appl. No.: 856,459

[22] Filed: Apr. 25, 1986

[51] Int. Cl.$^4$ .............................................. F16K 31/02
[52] U.S. Cl. ........................... 137/614.19; 137/596.17; 251/129.1; 251/129.14; 251/129.21
[58] Field of Search ........... 251/129.1, 129.14, 129.21; 137/596.17, 625.65, 614.19

[56] References Cited

U.S. PATENT DOCUMENTS

| | | | |
|---|---|---|---|
| 2,366,412 | 1/1945 | Lambert | 251/129.1 |
| 3,856,260 | 12/1974 | Giordano | 251/129.14 |
| 3,861,644 | 1/1975 | Knape | 251/129.14 |
| 3,874,406 | 4/1975 | Von Loewis | 137/596.17 |
| 3,989,063 | 11/1976 | Brouwers et al. | 251/129.1 |

Primary Examiner—A. Michael Chambers
Attorney, Agent, or Firm—Barnes, Kisselle, Raisch, Choate, Whittemore & Hulbert

[57] ABSTRACT

Electrohydraulic valves for use in high fluid pressure systems such as automotive anti-skid brake systems, power steering systems and machine tool systems comprising a valve body of magnetic material, a valve seat member of magnetic material having a non-magnetic insert defining the seat and a coil surrounding a portion of the valve body and the valve seat adapted to be controlled by a microcomputer to provide pulses to a ball positioned between the valve seats and thereby control the flow through the valve. In one form the valve includes a second set of opposed valve seats, a second ball, and a second coil. In each form, a sleeve surrounds the valve seats and the balls and hydraulically isolates them from the coil associated therewith.

7 Claims, 4 Drawing Figures

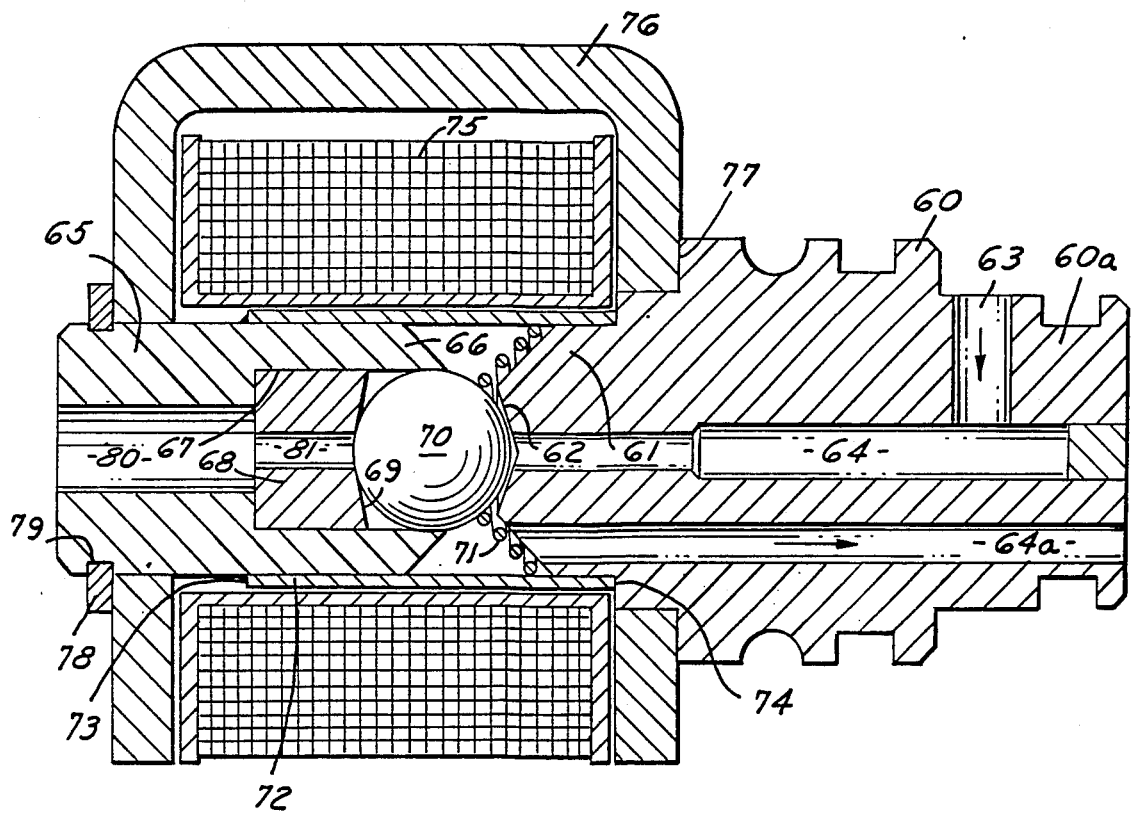
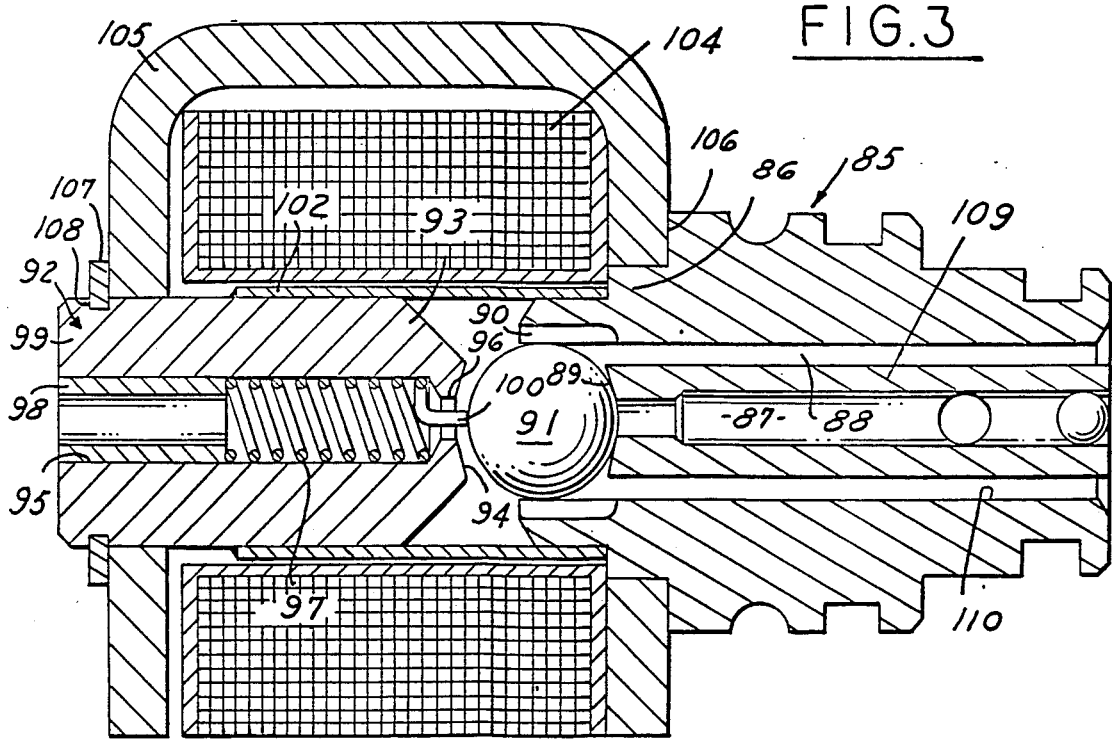

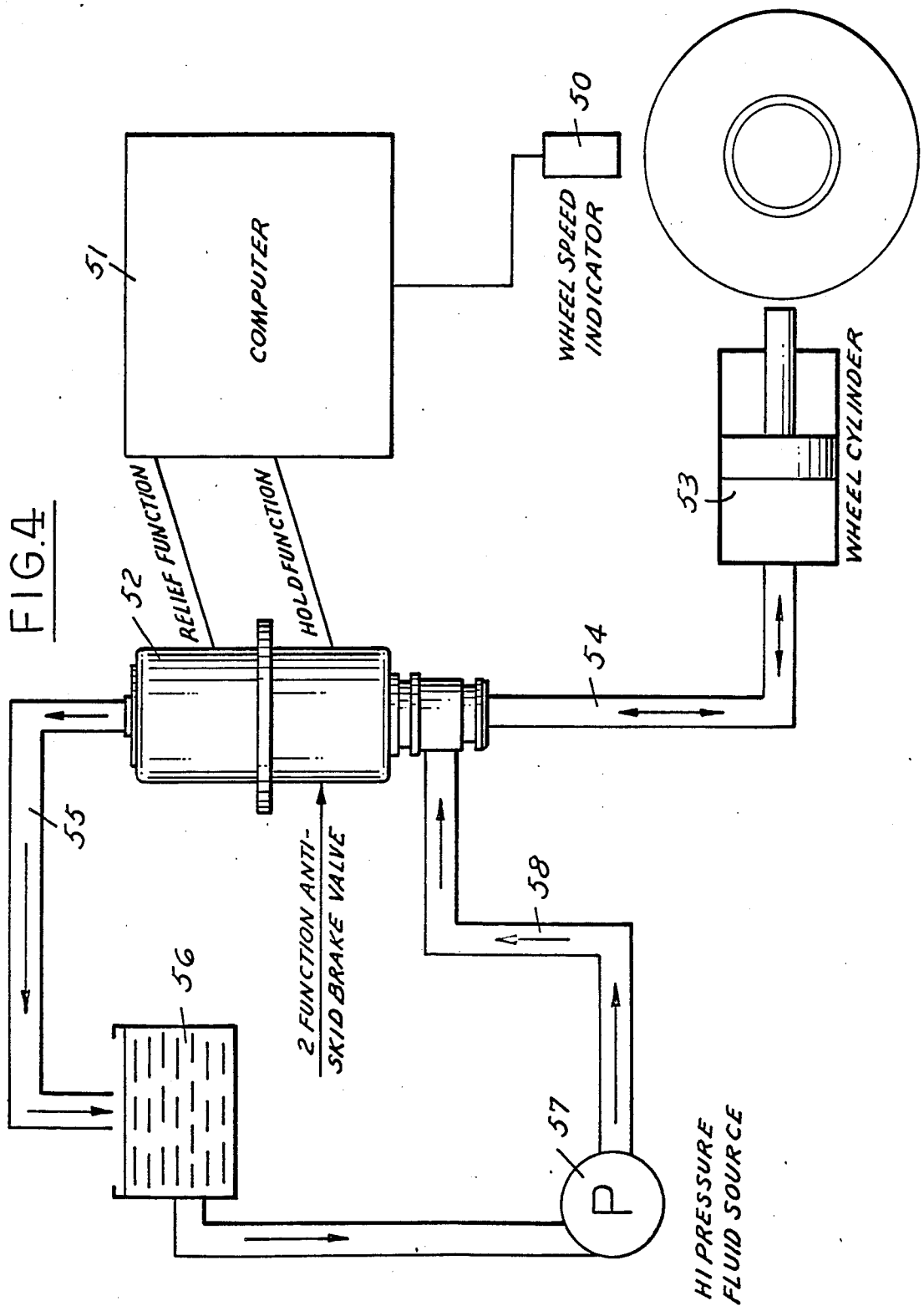

ELECTROHYDRAULIC VALVES FOR USE IN A SYSTEM

This invention relates to electrohydraulic valves for use in high fluid pressure systems such as automotive anti-skid brake systems, power steering systems and machine tool systems.

BACKGROUND AND SUMMARY OF THE INVENTION

In such systems, the hydraulic pressure is high, on the order of 3000 p.s.i. and it is important to isolate the coils of the electrohydraulic valve from the high pressure fluid. In addition, the hydraulic valve must be compact and have high magnetic efficiency.

In accordance with the invention, electrohydraulic valves for use in high fluid pressure systems such as automotive anti-skid brake systems, power steering systems and machine tool systems comprise a valve body of magnetic material, a valve seat member of magnetic material having a non-magnetic insert defining the seat and a coil surrounding a portion of the valve body and the valve seat adapted to be controlled by a microcomputer to provide pulses to a ball positioned between the valve seats and thereby control the flow through the valve. In one form the valve includes a second set of opposed valve seats, a second ball and a second coil. In each form, a sleeve surrounds the valve seats and the balls and hydraulically isolates them from the coil associated therewith.

DESCRIPTION OF THE DRAWINGS

FIG. 2 is a longitudinal sectional view of a modified form of electrohydraulic valve.

FIG. 3 is a longitudinal sectional view of a further modified form of electrohydraulic valve.

FIG. 4 is a schematic diagram of anti-skid system embodying the invention.

DESCRIPTION

Figure 1:
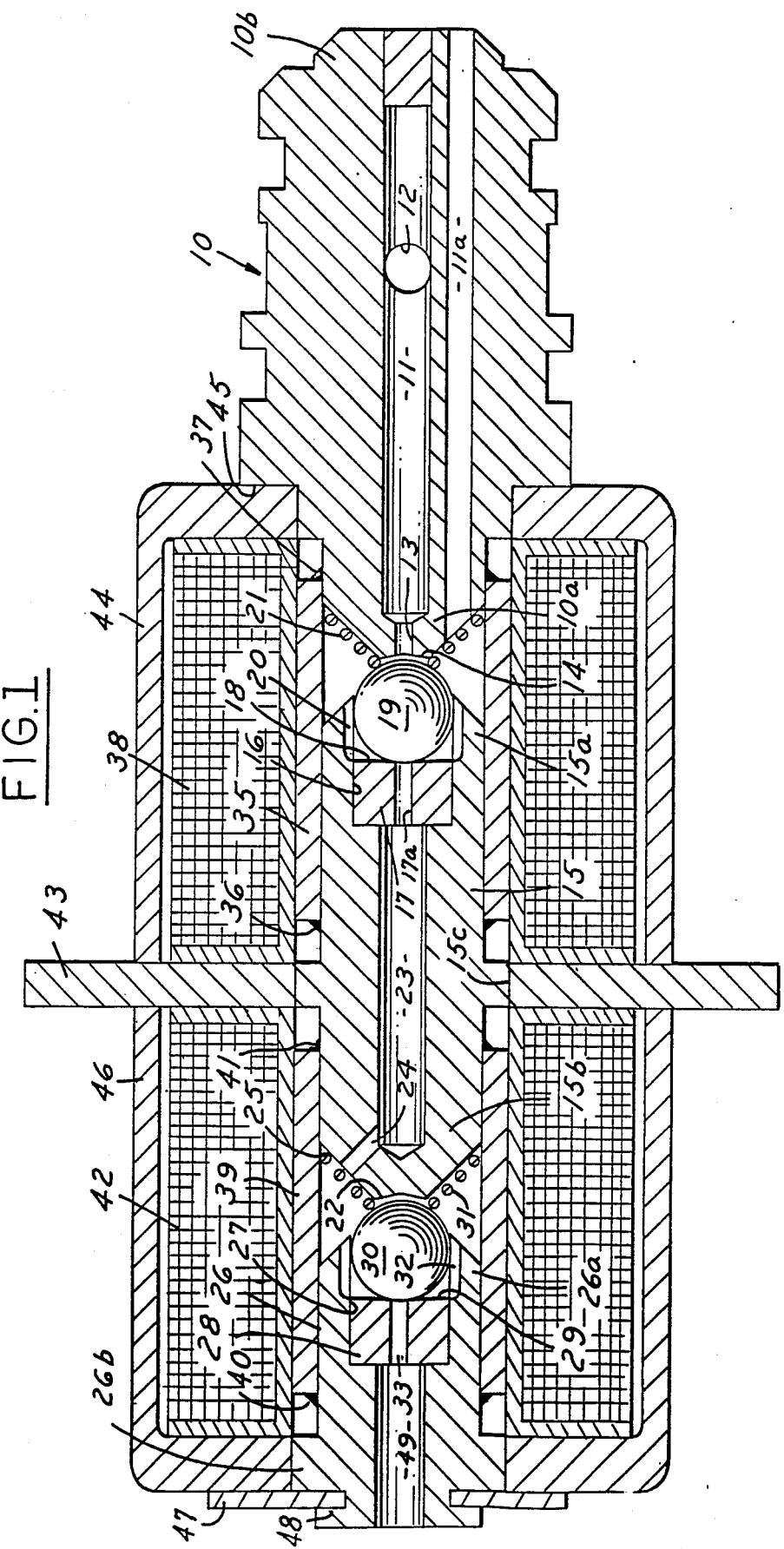
FIG. 1 is a longitudinal sectional view through a electrohydraulic valve embodying the invention.

Referring to FIG. 1 in one form of the electrohydraulic valve embodying the invention, the valve comprises a first body 10 of magnetic material having a axial passage 11 to which high pressure fluid from a pump or other source is supplied through a radial opening 12. The passage 11 extends through a restricted portion 13 of aligned opening 11 to a valve seat 14. An axial passage 11a extends from end 10a to the end 10b of the valve body 10. A second magnetic body 15 has an opening 16 in one end thereof in which a non-magnetic insert 17 is positioned to define a non-sealing seat 18 opposite the seat 14. The insert 17 is spaced from the free end of second body 15. A ball 19 of magnetic material is positioned in the opening 17 adjacent the end of the body 15 and projects beyond the end of the body 15. Circumferentially spaced axial grooves 20 are provided in the sides of opening 16 for facilitating flow, as presently described. A conical spring 21 is interposed between ball 19 and the body to urge the spring toward the non-sealing seat 18.

The second magnetic body 15 is provided at its other end with a second non-sealing seat 22. An axial passage 23 extends from and is aligned at one end with an axial passage 17a in insert 17. An angular passage 24 extends from the other end of passage 23 to the frustoconical surface 25 on the other end of the second body 15.

A third magnetic body 26 is provided with an opening 27 in one end in which an opposed non-magnetic insert 28 is positioned and defines a sealing seat 29 opposed to the seat 22. A second ball 30 of magnetic material is positioned in opening 27 and projects beyond the one end of third body 26. A spring 31 urges the ball 30 toward the sealing seat 29. Circumferentially spaced axial grooves 32 in the side of opening 27 surround the ball 30 to facilitate fluid flow as presently described.

An axial passage 49 in the third body 26 communicates at one end with an axial opening 33 in insert 28 and at the other end with the exterior.

A first cylindrical sleeve 35 of non-magnetic material is telescoped over the ends 10a, 15a of the first body 10 and second body 15, respectively, and is welded as at 36, 37 thereto to isolate hydraulically the ball 19 and associated seats 14, 18 from electrical coil 38. Similarly a second sleeve 39 of non-magnetic material is telescoped over the ends 15b, 26a of the second body 15 and third body 16, respectively, and welded as at 40, 41 thereto to isolate hydraulically the ball 30 and seats 22, 29 from electrical coil 42.

The second body 15 includes a separate washer or ring flange 43 of magnetic material that is press fitted onto second body 15 at diameter 15c. A first canister 44 is interposed between a flange 43 and a shoulder 45 on the first body 10 and surrounds at least a portion of the coil 38. Similarly, a second canister 46 is interposed between flange 43 and a snap ring 47 in a groove 48 in the end 26b of the third body 26.

The entire valve is adapted to be maintained submerged so that the entire interior of the valve and all passages contain hydraulic fluid with no trapped air, so that when the system is energized very little fluid flows through the valve.

The valve is constructed to contain the pressure so as not to expose the coils to fluid pressure, which certain systems may reach 3000 psi. The bodies 10, 15 and 26, center flange 43 between the coils, canisters 46, 44, and balls 19, 30 are the flux carrying members and are constructed of soft magnetic low carbon steel except balls 19, 30 which are of case hardened steel. Sleeves 35, 39 and seats 17, 28 are made of non-magnetic materials such as 304 stainless steel.

The flux path for coil 38 is through second body 15, across the radial air gap around ball 19, through ball 19, across the air gap adjacent seat 14, through end 10a into canister 44, through flange 43, and back into second body 15.

The flux path for coil 42 is through second or center body 15, across the air gap of seat 22, through ball 30, across the radial air gap around ball 30, through third body 26, through canister 46, through ring flange 43, and back into second body 15.

Non-magnetic sleeves 35, 39 structurally support the flux carrying members and is press fitted onto members and then secured by laser welding in a continuous fluid tight bead around each end as shown.

The ring flange 43 is a common flux carrier for both magnetic circuits and therefore the polarity of coils 38 and 42 must be such that the flux from both circuits are flowing in the same direction through the flange 43. To accomplish this the coils 38 and 42 are polarized electrically opposite. If the coils 38 and 42 were polarized the same, there will be opposing flux in ring flange 43 and the circuit would become so inefficient due to the resulting high flux losses that the device would not operate when both coils are energized.

The magnetic paths are constructed so that the non-magnetic sleeves 35, 39 contain the fluid pressure within the valve away from the coils and the outer canisters 44, 46 without intersecting the flux path while causing the flux to focus through the ball/ball cage/seat areas. The use of non-magnetic seats further allows the flux to focus through the ball cage/ball/seat area by reducing direct axial flux.

The configuration of each seat is not limited to the exact configuration shown and is limited only by the fact that the fluid must ultimately enter through the center at seat and leave through some conduit out of cavity.

The electrohydraulic valve may be used in any hydraulic system utilizing high pressure fluids wherein it is desired that the coils be hydraulically isolated from the fluid.

A typical arrangement, for example, would be for anti-skid brake systems. In anti-skid brake systems, a wheel speed indicator inputs wheel speed to the computer at regular intervals. The intervals vary in accordance with the system but may be on the order of one-tenth and one-fiftieth of a second. The computer then calculates the angular deceleration/acceleration of the wheel from the wheel speed data. When the deceleration is greater than a prescribed value indicating skid, the computer initiates a hold function on a valve and, if the deceleration is severe enough, a pressure relief function is activated in the valve that is controlled by the computer. The valve exhausts into the master cylinder reservoir of the brake system or may be located in the reservoir. High pressure hydraulic fluid is supplied either from the master cylinder or a high pressure pump or both.

Referring to FIG. 4, a typical anti-skid system comprises a wheel speed indicator 50 that senses wheel speed and provides a signal to a computer 51. The computer 51 controls an anti-skid valve 52 and operates to actuate the valve through a hold function signal when the deceleration is greater than a prescribed value and to actuate a relief function if the deceleration is severe enough. The valve 52 is submerged in reservoirs 56 and controls flow to a wheel cylinder 53 through a line 54 and has an exhaust through a line 55 to the reservoir 56. Pump 57 delivers fluid at high pressure to the valve through a line 58 and receives supply fluid from a reservoir 59.

In a typical system, one valve will be provided for each wheel. However in some instances, both rear wheels are controlled through one valve.

Thus, such anti-skid systems function to release the pressure on a wheel cylinder whenever the wheel tends to lock up indicating a skid condition in order to avoid skidding.

Instead of utilizing a high pressure fluid pump, the high pressure fluid may use the master cylinder of the brake system as a source.

When the brake pedal is depressed, the high pressure fluid enters the valve through opening 12 and proceeds to the valve interior through opening 11. In the unenergized condition, ball 19 is held off seat 14 by spring 21 and against non-sealing seat 18. Since seat 18 is non-sealing, fluid pressure passes around it through passages 20 into opening 17a to passages 23, 24. Ball 30 is held in sealing engagement with sealing seat 29 by spring 31. As the interior of the valve is pressurized, fluid pressure from the cavity about ball 30 is transmitted out through axial supply passage 32 through the brake lines to the wheel cylinder.

With the brake pedal depressed and the valve deenergized, the system acts like a standard brake system and the valve has no effect on the system. However, if the wheel begins to slow too radially, the microcomputer will energize coil 38 which will pull ball 19 onto sealing engagement with seat 14 preventing any additional pressure from entering the interior of the valve or the wheel cylinder. In this condition, the pressure to the wheel cylinder is constant at the pressure on the interior of the valve prior to energizing coil 38. If in this condition the wheel still continues to slow too rapidly, coil 42 is momentarily energized causing ball 30 to be momentarily pulled from sealing engagement on non-magnetic seat 29 of nonsealing magnetic seat 22 and then back into sealing engagement on seat 29. During the ball transition, some pressure from the interior of the valve and connected wheel cylinder will be vented into the reservoir through exhaust passage 32. The microcomputer will continue to pulse ball 30 until the wheel speed increases above lock up. The system reads wheel speeds at a predetermined frequency such as between 10 and 80 times per second, thus ball 30 could be pulsed at these frequencies. If the pressure to the wheel cylinder is reduced too much by this method and the wheel speed increases, coil 38 would be deenergized allowing master cylinder fluid pressure to act on the wheel cylinder until the wheel again approaches lock up. These systems are normally equipped with an high pressure accumulator in conjunction with the master cylinder to provide a reserve quantity to high pressure fluid for operation of the system.

In the modified form shown in FIG. 2, a single ball electrohydraulic valve is provided and comprises a first valve body 60 of magnetic material having one end 61 defining a first seat 62 to which fluid is supplied from an external radial opening 63 to an axial opening 64. Valve body 60 includes a second axial passage 64a extending from end 61 to the end 60a. A second valve body 65 of magnetic material has one end 66 formed with an opening 67 in which a non-magnetic insert 68 is positioned and defines a second seat 69. A ball 70 of magnetic material is provided in opening 67 and projects beyond end 66 between the seats 62, 69 and is yieldingly urged toward the seat 69 by a spring 71.

A non-magnetic sleeve 72 is press fitted over the ends 61, 66 of bodies 60, 65 and welded as at 73, 74. An electrical coil 75 surrounds the sleeve and a U-shaped bracket 76 of magnetic material is interposed between a shoulder 77 on body 60 and a snap ring 78 in a groove 79 on body 65.

Body 65 includes a passage 80 that communicates at one end with an opening 81 in insert 68 and extends at the other end to the exterior.

When the coil 75 is de-energized, full pressure will be applied, in the case of a brake system full brake pressure through passages 63, 64 and 64a. Full energization of the valve will shut off passage 64 and allow existing fluid pressure in the wheel cylinder to exit the valve through passage 80. In the case of an anti-skid system the valve must operate at a duty cycle less than about 90% to insure some braking force is applied to the wheels. In a normal stopping situation, the valve would not be energized since the wheels would not tend to skid.

In the form of electrohydraulic valve shown in FIG. 3, the electrohydraulic valve is similar to that shown in FIG. 2 except that the valve is normally closed.

In this form, the first body 85 of magnetic material includes an end 86, an axial passage 87 and passages 88 extending to a seat 89 which is part of a non-magnetic insert 109 positioned in an opening 110 of first body 85. The insert 109 has two flats machined on it that form passages 88 between the insert 109 and opening 110 in the first body 85. Insert 109 is recessed in body 85 and body 85 has circumferentially spaced axial grooves 90 in the end 86. Ball 91 of magnetic material is positioned in the end 86 and projects beyond the end 86. A second body 92 of magnetic material has an end 93 positioned adjacent the ball 91 and has a seat 94. The body 92 includes an axial passage 95 with a narrow portion 96. A spring 97 is positioned in passage 95 and abuts against the end of a tubular pin 98 press fitted in the opposite end 99 of the body 92. The spring includes a projection 100 extending through the opening 96 urging the ball 91 against seat 89.

As in the previous form of the invention, a sleeve 102 of non-magnetic material is press fitted on the bodies 85, 92 and is welded thereto to span the ends 86, 93.

Coil 104 surrounds the sleeve 102 and a U-shaped bracket 105 of magnetic material is provided about the coil with one end engaging a shoulder 106 on body 85 and the other end engaging snap ring 107 extending into a groove 108 on body 92.

I claim:

1. An electrohydraulic valve comprising:
a first body of magnetic material,
said first body defining a first sealing seat at one end,
said first body having an inlet passage therein extending to said first seat,
said first body having a passage from said one end to the exterior thereof,
a second body of magnetic material having a first end and a second end,
a non-magnetic insert in said first end of said second body defining a second seat,
a ball of magnetic material interposed between said first and second seats,
said non-magnetic insert having an opening from said second seat and said second body having a passage extending from said opening in said insert to the second end of said second body,
a sleeve of non-magnetic material surrounding said first and second seats and said ball and being hydraulically sealed to said first body and said second body,
an electric coil surrounding said sleeve,
said second body having a separate radial ring flange,
a canister of magnetic material surrounding said coil and said sleeve and connected directly to said flange and said first body to define a magnetic flux path,
said sleeve being positioned out of the primary path of said magnetic flux through the one end of the first body, the ball, and the first end of said second body, the radial flange of said second body, said canister, and back to said first body without substantially intersecting said sleeve.

2. The electrohydraulic valve set forth in claim 1 including spring means yieldingly urging said ball toward one of said seats.

3. The electrohydraulic valve set forth in claim 2 wherein said spring means urges said ball toward said second seat.

4. The electrohydraulic valve set forth in claim 1 wherein said second seat is a non-sealing seat.

5. An electrohydraulic valve comprising:
a first body of magnetic material,
said first body defining a first sealing seat at one end,
said first body having an inlet passage therein extending to said first seat,
said first body having a passage from said one end to the exterior thereof,
a second body of magnetic material having a first end and a second end,
a non-magnetic insert in said first end of said second body defining a second seat,
a ball of magnetic material interposed between said first and second seats,
said non-magnetic insert having an opening from said second seat and said second body having a passage extending from said opening in said insert to the second end of said second body,
a sleeve of non-magnetic material surrounding said first and second seats and said ball and being hydraulically sealed to said first body and said second body,
an electric coil surrounding said sleeve,
said second body having a separate radial ring flange,
a canister of magnetic material surrounding said coil and said sleeve and connected directly to said flange and said first body to define a magnetic flux path,
said second body defining a third seat at the other end thereof,
a third body of magnetic material having one end supporting a second non-magnetic insert defining a fourth seat opposite said third seat, said second non-magnetic insert and said third body having communicating openings extending to the exterior of said third body,
a second ball of magnetic material interposed between said third and fourth seats,
a sleeve of non-magnetic material surrounding said third or fourth seats and said second ball and being hydraulically sealed to said second body and said third body,
a second electric coil surrounding said second sleeve,
a second canister of magnetic material surrounding said second coil and said second sleeve and connected directly to said flange and said third body to define a magnetic flux path.

6. The electrohydraulic valve set forth in claim 9 including spring means yieldingly urging said first-mentioned ball toward said second seat and spring means yieldingly urging said second ball toward said fourth seat.

7. The electrohydraulic valve set forth in claim 10 wherein said second seat is a non-sealing seat.

* * * * *

UNITED STATES PATENT AND TRADEMARK OFFICE
CERTIFICATE OF CORRECTION

PATENT NO. : 4,674,536

DATED : June 23, 1987

INVENTOR(S) : Frank G. Warrick

It is certified that error appears in the above–identified patent and that said Letters Patent are hereby corrected as shown below:

Column 6, line 57, "claim 9" should be --claim 5--
Column 6, line 62, "claim 10" should be --claim 6--

Signed and Sealed this

Third Day of November, 1987

Attest:

DONALD J. QUIGG

*Attesting Officer*  *Commissioner of Patents and Trademarks*